(12) United States Patent
Richard et al.

(10) Patent No.: US 7,777,832 B2
(45) Date of Patent: Aug. 17, 2010

(54) MULTI-FUNCTION ENHANCEMENT FILM

(75) Inventors: James T. Richard, Lake Elmo, MN (US); Clinton L. Jones, Somerset, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 894 days.

(21) Appl. No.: 11/283,307

(22) Filed: Nov. 18, 2005

(65) Prior Publication Data

US 2007/0115407 A1    May 24, 2007

(51) Int. Cl.
*G02F 1/1335* (2006.01)

(52) U.S. Cl. .................... 349/64; 349/112; 349/62; 349/61

(58) Field of Classification Search ............. 349/60–62, 349/112; 385/146; 362/246, 335, 558
See application file for complete search history.

(56) References Cited

U.S. PATENT DOCUMENTS

| | | |
|---|---|---|
| 3,531,358 A | 9/1970 | Rost et al. |
| 3,754,813 A | 8/1973 | DePalma |
| 3,765,281 A | 10/1973 | Wolfe |
| 3,788,171 A | 1/1974 | Hoadley |
| 3,851,093 A | 11/1974 | Sunstein |
| RE29,091 E | 12/1976 | DePalma |
| 4,542,449 A | 9/1985 | Whitehead |
| 4,576,850 A | 3/1986 | Martens |
| 4,791,540 A | 12/1988 | Dreyer, Jr. |
| 4,804,253 A | 2/1989 | Stewart |
| 4,906,070 A | 3/1990 | Cobb, Jr. |
| 4,971,719 A | 11/1990 | Vaz et al. |
| 4,984,144 A | 1/1991 | Cobb, Jr. et al. |
| 5,005,108 A | 4/1991 | Pristash |
| 5,076,668 A | 12/1991 | Dalisa |
| 5,128,783 A | 7/1992 | Abileah |
| 5,146,415 A | 9/1992 | Faris |
| 5,161,041 A | 11/1992 | Abileah |
| 5,190,370 A | 3/1993 | Miller |
| 5,247,390 A | 9/1993 | Hed |
| 5,268,782 A | 12/1993 | Wenz et al. |

(Continued)

FOREIGN PATENT DOCUMENTS

DE    3407431    8/1985

(Continued)

OTHER PUBLICATIONS

US 2001/0013282 A1, 08/2001, LaBelle et al. (withdrawn)

*Primary Examiner*—Hoan C Nguyen

(57) ABSTRACT

A light management unit is described for attachment to a display module, especially suited for an LCD TV or LCD monitor. The light management unit includes a directionally recycling layer including a structured side and a planar side where the structured side includes prism structures. The light management unit also includes a reflective polarizer positioned on the planar side of the directionally recycling layer. The light management unit also includes a diffusion structure incorporated into either the directionally recycling layer or between the directional recycling layer and the reflective polarizer. The diffusion structure causes a level of diffusion that is sufficient to prevent the appearance of colored bands when a viewer positioned along a line of sight that is perpendicular to the direction of the prism structures views the light management unit, illuminated from below, at an oblique angle from a vertical axis.

22 Claims, 6 Drawing Sheets

U.S. PATENT DOCUMENTS

| | | | |
|---|---|---|---|
| 5,280,371 A | 1/1994 | McCartney, Jr. | |
| 5,394,255 A | 2/1995 | Yokota | |
| 5,435,963 A | 7/1995 | Rackovan et al. | |
| 5,467,208 A | 11/1995 | Kokawa | |
| 5,492,590 A | 2/1996 | Sakai | |
| 5,521,797 A | 5/1996 | Kashima | |
| 5,550,657 A | 8/1996 | Tanaka | |
| 5,552,907 A | 9/1996 | Yokota | |
| 5,592,332 A | 1/1997 | Nishio | |
| 5,596,429 A | 1/1997 | Kokawa | |
| 5,598,280 A | 1/1997 | Nishio | |
| 5,600,455 A | 2/1997 | Ishikawa | |
| 5,600,462 A | 2/1997 | Suzuki | |
| 5,627,626 A * | 5/1997 | Inoue et al. | 355/67 |
| 5,627,926 A | 5/1997 | Nakamura | |
| 5,659,408 A | 8/1997 | Wenyon | |
| 5,748,269 A | 5/1998 | Harris et al. | |
| 5,767,931 A | 6/1998 | Paczkowski | |
| 5,771,328 A | 6/1998 | Wortman | |
| 5,828,488 A | 10/1998 | Ouderkirk et al. | |
| 5,919,551 A | 7/1999 | Cobb, Jr. | |
| 5,997,964 A | 12/1999 | Klima, Jr. | |
| 6,025,897 A * | 2/2000 | Weber et al. | 349/96 |
| 6,052,164 A | 4/2000 | Cobb, Jr. et al. | |
| 6,079,840 A | 6/2000 | Ono et al. | |
| 6,091,547 A | 7/2000 | Gardiner et al. | |
| 6,104,854 A | 8/2000 | Masaki | |
| 6,111,696 A | 8/2000 | Allen et al. | |
| 6,185,043 B1 | 2/2001 | Imamura | |
| 6,191,833 B1 | 2/2001 | Hirakata | |
| 6,219,127 B1 | 4/2001 | Hirakata et al. | |
| 6,322,236 B1 | 11/2001 | Campbell | |
| 6,364,497 B1 | 4/2002 | Park et al. | |
| 6,411,353 B1 | 6/2002 | Yarita et al. | |
| 6,462,794 B1 | 10/2002 | Yoshikawa et al. | |
| 6,502,945 B2 | 1/2003 | Kim et al. | |
| 6,538,709 B1 | 3/2003 | Kurihara | |
| RE38,243 E | 9/2003 | Oe et al. | |
| 6,613,421 B2 | 9/2003 | Jonza et al. | |
| 6,661,482 B2 | 12/2003 | Hara | |
| 6,661,487 B2 | 12/2003 | Takahashi et al. | |
| 6,685,795 B1 | 2/2004 | Braun | |
| 6,708,595 B1 | 3/2004 | Chaussade et al. | |
| 6,891,580 B2 | 5/2005 | Jang et al. | |
| 6,894,821 B2 * | 5/2005 | Kotchick | 359/246 |
| 6,900,941 B2 * | 5/2005 | Kaminsky et al. | 359/599 |
| 6,903,788 B2 * | 6/2005 | Shiraogawa et al. | 349/115 |
| 6,913,365 B2 | 7/2005 | Masaki | |
| 2002/0080598 A1 | 6/2002 | Parker et al. | |
| 2002/0124950 A1 | 9/2002 | Klima | |
| 2002/0196397 A1 | 12/2002 | Sugiura | |
| 2003/0063251 A1 | 4/2003 | Murata et al. | |
| 2003/0133207 A1 | 7/2003 | Minami et al. | |
| 2004/0141103 A1 | 7/2004 | Kotchick | |
| 2004/0150874 A1 | 8/2004 | Suzuki | |
| 2005/0046767 A1 | 3/2005 | Freking et al. | |
| 2006/0108050 A1 | 5/2006 | Satake et al. | |

FOREIGN PATENT DOCUMENTS

| | | |
|---|---|---|
| EP | 0 770 899 | 5/1997 |
| EP | 0 531 939 | 12/1999 |
| EP | 1134068 | 9/2001 |
| EP | 1168282 A | 1/2002 |
| EP | 1220014 | 7/2002 |
| EP | 1302922 | 4/2003 |
| JP | 6-18707 | 1/1994 |
| JP | HEI-6-342106 | 12/1994 |
| JP | 07043713 A | 2/1995 |
| JP | 09-267424 | 10/1997 |
| JP | 11259021 | 9/1999 |
| JP | 2001301104 A | 10/2001 |
| JP | 2002304254 A | 10/2002 |
| JP | 2003-207767 | 7/2003 |
| KR | 1019970007399 | 2/1997 |
| WO | WO 9527929 | 11/1995 |
| WO | WO 96/27757 | 9/1996 |
| WO | WO 97/28468 | 8/1997 |
| WO | WO 0150160 | 7/2001 |
| WO | WO 0221167 A | 3/2002 |
| WO | WO 03010569 | 2/2003 |
| WO | WO 03/042747 | 5/2003 |

* cited by examiner

MULTI-FUNCTION ENHANCEMENT FILM

BACKGROUND OF THE INVENTION

The present invention relates generally to an optical assembly. More particularly, the invention relates to a film assembly for use in a display system.

Some optical display systems include a film designed to increase the amount of on-axis brightness of the optical display system by redirecting off-axis light and recycling the on-axis light such that it eventually emerges from the display as on-axis light. For example, the 3M brand BRIGHTNESS ENHANCEMENT FILM (BEF) available from 3M Company of St. Paul, Minn. is one type of optical film that can be used to enhance optical display systems. BEF and similar films typically include an array of prisms on one surface that are large in comparison with the wavelength of light. These structures increase the amount of light that is directed toward a viewer. In use, these films typically increase on-axis illumination at the expense of off-axis illumination in one or two dimensions. In this fashion, the material can help the display designer achieve the desired amount of on-axis illumination with reduced power consumption. Various embodiments of BEF and other similar films having structured surfaces are described in, e.g., U.S. Pat. No. 5,394,255 (Yokota et al.); U.S. Pat. No. 5,552,907 (Yokota et al.); U.S. Pat. No. 6,052,164 (Cobb, Jr. et al.); U.S. Pat. No. 6,091,547 (Gardiner et al.); and U.S. Pat. No. 6,111,696 (Allen et al.).

Brightness enhancement may be achieved with such prismatic structured surface films through a process of reflection and refraction that preferably includes light recycling. When used in preferred backlight configurations, prismatic structured surface films help to direct light toward the viewer (usually positioned directly in front of the display system) that would otherwise leave the screen at a high angle, missing the viewer.

Improvements in display brightness, uniformity, and overall performance are continually being sought, and brightness enhancement films and prism structures are often utilized in liquid crystal displays.

Liquid crystal displays (LCDs) are optical displays used in devices such as laptop computers, hand-held calculators, digital watches and televisions. Some LCDs include a light source that is located to the side of the display, with a light guide positioned to guide the light from the light source to the back of the LCD panel. Other LCDs, for example some LCD monitors and LCD televisions (LCD-TVs), are directly illuminated using a number of light sources positioned behind the LCD panel. This arrangement is increasingly common with larger displays, because the light power requirements, to achieve a certain level of display brightness, increase with the square of the display size, whereas the available real estate for locating light sources along the side of the display only increases linearly with display size. In addition, some LCD applications, such as LCD-TVs, require that the display be bright enough to be viewed from a greater distance than other applications, and the viewing angle requirements for LCD-TVs are generally different from those for LCD monitors and hand-held devices.

Some LCD monitors and most LCD-TVs are commonly illuminated from behind by a number of cold cathode fluorescent lamps (CCFLs). These light sources are often linear and typically extend across one entire dimension of the display, either in a parallel array or along an edge.

SUMMARY OF THE INVENTION

A light management unit is provided for attachment to a display module. The light management unit includes a directionally recycling layer including a structured side and a planar side. The structured side includes prism structures. The light management unit also includes a reflective polarizer adapted to transmit light having a first polarization orientation and to reflect the light having a different polarization orientation. The reflective polarizer is positioned on the planar side of the directionally recycling layer. A diffusion structure is incorporated into the directional recycling layer or the interfaces between the directional recycling layer and the reflective polarizer. The diffusion structure diffuses light that passes through the diffusion structure. The diffusion caused by the diffusion structure is sufficient to prevent the appearance of colored bands when a viewed positioned along a line of sight perpendicular to the prism structures views the film structure at an oblique angle from a vertical axis.

A display device is also described including a backlight, a liquid crystal display panel, and a light management unit as described in the preceding paragraph.

The prism structures have an angle of 90 degrees in one embodiment.

The diffusion structure incorporated into the light management unit takes many different forms in different embodiments. For example, the diffusion structure includes a roughened surface on the structured side of the directionally recycling layer in one embodiment. In another embodiment, the light management unit also includes an adhesive layer between the directionally recycling layer and the reflective polarizer, and the diffusion structure includes light scattering particles in the adhesive layer.

The directionally recycling layer typically includes a prism substrate layer and prism structure layer that includes the prism structures. Another example of the diffusion structure is light diffusing features scattered throughout an interior of the prism structure layer or the prism substrate layer. The light diffusing features are selected from the group of beads of a different refractive index than a resin forming the prism structures, micro-voids of air, and light scattering particles.

In another embodiment, the diffusion structure includes a difference in indices of refraction between the prism substrate layer and the prism structured layer, and a roughened surface on the prism substrate layer that is adjacent to the prism structure layer.

Another example of the diffusion structure is a difference in indices of refraction between the prism substrate layer and the adhesive layer, and a roughened surface on the side of the prism substrate layer that is adjacent to the adhesive layer.

In another embodiment, the diffusion structure includes a reflective polarizer skin layer with diffused features positioned between the directionally recycling layer and the reflective polarizer.

The invention may be more completely understood by considering the detailed description of various embodiments of the invention that follows in connection with the accompanying drawings.

Figure 1:
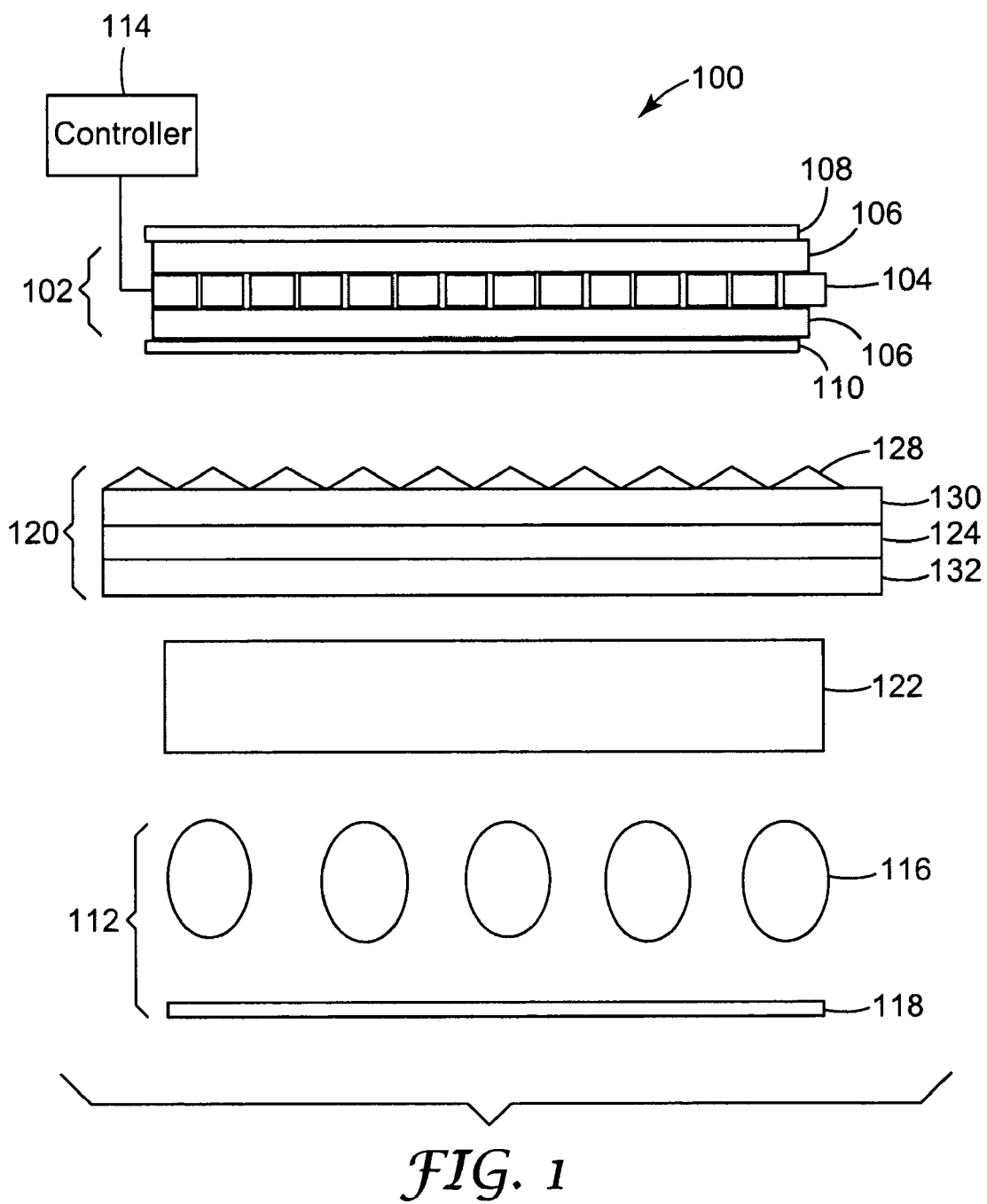
FIG. 1 illustrates an exploded schematic view of an LCD-TV structure with a light management unit and anti-glare polarizers.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE PREFERRED EMBODIMENT

The present invention is applicable to liquid crystal displays (LCDs, or LC displays), and is particularly applicable to LCDs that are directly illuminated from behind, for example, large computer monitors and LCD televisions (LCD-TVs). The invention is especially applicable to LCDs where the light sources are linear and stretch across the full width of the display. The invention could also be useful in other systems including edge-lit systems.

The invention is directed to a directly-illuminated LCD device that has an arrangement of light management layers positioned between the LCD panel and the light source. A light management unit typically serves to improve the performance of the display by affecting the light passing through it in multiple ways.

First the basic components of an LCD device will be described, since an LCD device is the typical context of use of a light management unit according to the invention. A schematic exploded view of an exemplary embodiment of an LCD device 100 is presented in FIG. 1. Such a display device 100 may be used, for example, in an LCD monitor or LCD-TV. The display device 100 includes a liquid crystal panel 102, which typically includes a layer of liquid crystal 104 disposed between panel plates 106. An upper absorbing polarizer 108 is positioned above the LC layer 104 and a lower absorbing polarizer 110 is positioned below the liquid LC layer 104. The upper and lower polarizers 108, 110 may include an anti-glare coating.

The plates 106 are often formed of glass and may include electrode structures and alignment layers on their inner surfaces for controlling the orientation of the liquid crystals in the LC layer 104. The electrode structures are commonly arranged so as to define LC pixels, areas of the LC layer where the orientation of the liquid crystals can be controlled independently of adjacent areas. A color filter may also be included with one or more of the plates 106 for imposing color on the image displayed.

The absorbing polarizers 108, 110 and the LC panel 102 in combination control the transmission of light from light source region 112 through the display to the viewer. Selective activation of the different pixels of the LC layer 104, for example by controller 114, results in the light passing out of the display at certain desired locations, thus forming an image seen by the viewer. The controller 114 may include, for example, a computer or a television controller that receives information to generate television images.

The light source region 112 includes a number of light sources 116 that generate the light that illuminates the LC panel 102. The light sources 116 used in an LCD-TV or LCD monitor are often linear, cold cathode, fluorescent (CCFL) tubes that extend across the display device 100. Many types of light sources may be used, such as filament or arc lamps, light emitting diodes, flat fluorescent panels, serpentine or U-shaped CCFL tubes or external fluorescent lamps. This list of light sources is not intended to be limiting or exhaustive, but only exemplary.

The light source region 112 may also include a reflector 118 for reflecting light propagating downward from the light sources 116. The reflector thereby directs light that would otherwise travel away from the LC panel 102 back toward the LC panel 102. The reflector 118 is also useful for recycling light within the display device as explained below. The reflector 118 may be a specular reflector or may be a diffuse reflector.

The display 100 also includes a diffuser plate 122. The diffuser is used to diffuse the light received from the light sources, resulting in an increase in the uniformity of the illumination light incident on the LC panel 102. Consequently, the inclusion of the diffuser plate results in an image that is more uniformly bright as it is perceived by the viewer.

The light management unit 120 is positioned between the light source region 112 and LC panel 102. This unit affects the light propagating from the light source region 112 so as to improve the operation of the display device 100. Now, the main components of the light management unit will be described.

The light management unit 120 may include a reflective polarizer 124. The light sources 116 typically produce unpolarized light but the lower absorbing polarizer 110 only transmits a single polarization state. Therefore, without the reflective polarizer, about half of the light generated by the light sources would not be transmitted through to the LC layer 104. The reflecting polarizer 124 however may be used to reflect the light that would otherwise be absorbed in the lower absorbing polarizer so that this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. The reflective polarizer works with the reflector to recycle light of the polarization that would otherwise be absorbed by the absorbing polarizer 110. In this manner, the reflecting polarizer 124 may be used to increase the fraction of light emitted by the light sources 116 that reaches the LC layer 104. As a result of the inclusion of the reflective polarizer 124, the image produced by the display device 100 is brighter.

The light management unit 120 may also include a directionally recycling layer 128. A directionally recycling layer is one that includes a surface structure that redirects off-axis light in a direction closer to the axis of the display. This increases the amount of light propagating on-axis through the LC layer 104, thus increasing the brightness of the image seen by the viewer. One example is a prismatic layer, which has a number of prismatic ridges that redirect the illumination light through refraction and reflection. Another surface structure example is pyramid structures.

Figure 2:
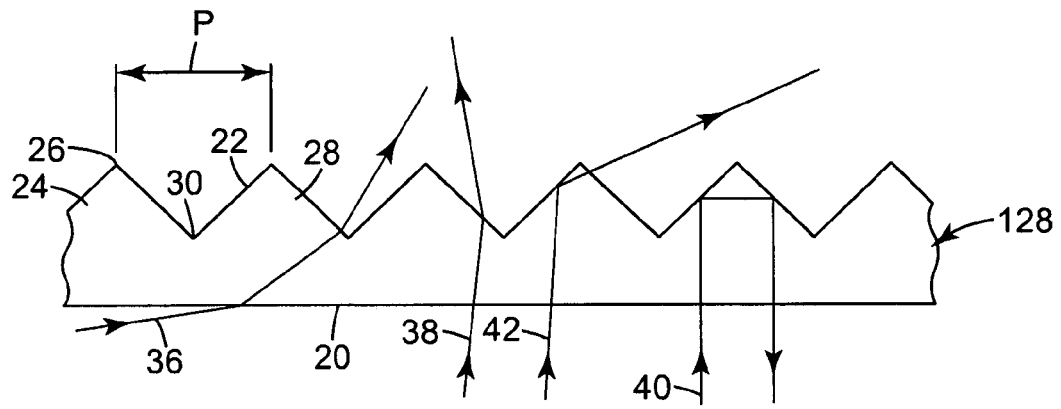
FIG. 2 illustrates a directionally recycling layer that can be included in the light management unit of the present invention.

FIG. 2 shows a layer 128 intended to increase the on axis brightness of a display. Layer 128 has a first surface 20 and a second surface 22. Second surface 22 includes a plurality of structures. Generally these structures are triangular prisms such as prism 24 although other shapes may be used. Prism 24 has a peak 26. Experience has shown that the gain (i.e. the ratio of the on axis brightness of a backlight with the film to the on axis brightness of the same backlight without the film) will be greatest if peak 26 is a sharp corner and forms an angle of 90°, although other considerations may cause a user to choose a rounded corner or other angles. Between prism 24 and adjacent prism 28 is a valley 30. As with peak 26, layer 128 will have the highest gain if valley 30 is sharp and forms an angle of 90° although valley 30 could be rounded or form other angles.

The prisms have a peak-to-peak separation known as the pitch, P, of layer 128. Generally the pitch should be small enough that the prisms will not be visible to a user viewing a display including layer 128, but not so small that diffractive effects reduce performance. Commercial products generally have had pitches between about 24 µm and 50 µm.

Typically first surface 20 will be a smooth surface. In this context, a smooth surface will be understood to mean that any structures on surface 20 are small in comparison to the size of the prisms such as prism 24 on side 22 of layer 128. Commonly surface 20 will be a matte surface in order to help hide any structure of the backlight behind layer 128. Alternatively, side 20 might have other structures such as a moth eye structure for reducing fresnel reflections from surface 20.

FIG. 2 shows four exemplary light rays. The first, light ray 36, approaches surface 20 at a grazing angle, i.e. an angle to the normal approaching 90°. Light ray 36 will be refracted towards the normal to layer 128 as it passes through surface 20. Upon reaching structured surface 22, it will be refracted again. Because of the structures on structured surface 22 it will be refracted so that again it will make a smaller angle to the normal to layer 128. Light ray 38 approaches smooth surface 20 at an angle much closer to the normal to layer 128. It is also refracted as it passes through surface 20, but to a lesser extent. Upon exiting through surface 22, it is refracted again so that it is on the opposite side of the normal to layer 128 that it was on upon first striking surface 20. Light ray 40 approaches at an angle close to or at the normal to layer 128 and is totally internally reflected twice by structured surface 22 in return toward the backlight. Light ray 42 approaches surface at an angle similar to that of light ray 38 but in a location such that it is totally internally reflected by one side of a prism on structured surface 22 but not by the second side. As a result it emerges at a large angle to the normal to layer 128. Because such a reflection only occurs to a light ray that is traveling in direction that forms a high incidence angle to the side it strikes, the prisms provide a very small cross section to such rays. In addition, many of those rays will re-enter the next prism and be returned into the display.

As may be seen from this discussion, light that, absent layer 128, would have emerged from the display at a high angle to the axis of the display is redirected into a direction closer to that axis. A small amount of light will be directed out at a large angle to the axis. Thus, we may say that light that enters layer 128 through surface 20 with an angle of incidence greater than a predetermined angle is directed into a narrower range of angles than the range of angles through which it entered. Light that enters layer 128 through smooth surface 20 at an angle of incidence less than that predetermined angle will be reflected back towards the backlight.

The light that is reflected back towards the backlight will be diffused and reflected back towards layer 128. In general, it will make a different angle than it made the first time. The process is then repeated so that more of the light is redirected into the narrower range of angles. The key aspect of the operation of layer 128 is that layer 128 must be capable of reflecting light striking it in a first predetermined range of angles and passing but refracting light striking it in a second predetermined range of angles wherein the angles in the second range of angles are greater than those in the first range of angles and wherein the light in the second range of angles is refracted into a narrower range of angles than those through which they entered.

The prism structures are straight prisms in one embodiment. The prism structures can alternatively be interrupted, wavy, elongated, an array of lenslets, an array of pyramids, or other regular or irregular patterns.

Figure 3:
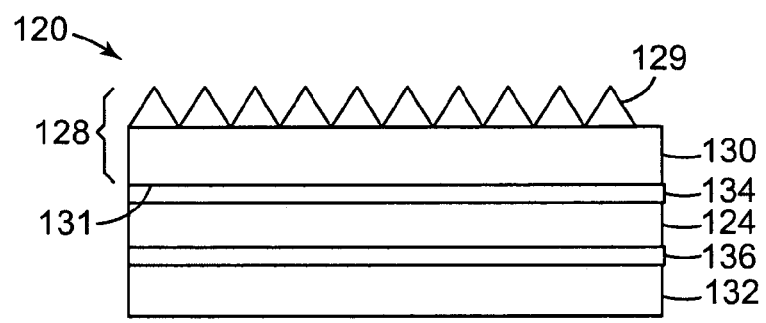
FIG. 3 illustrates a cross-sectional view of a light management unit according to the present invention.

FIG. 3 shows one example of a light management unit for use in an LCD-TV or LCD monitor. The light management unit 120 includes a directionally recycling film 128 which includes a number of prismatic ridge structures 129 on a substrate 130. The directionally recycling layer 128 includes a structured side, including prism structures 129 in the example of FIG. 3, and a planar side 131 opposite the structured side. Below the prism substrate 130 is a reflecting polarizer 124. Below the reflecting polarizer 124 is a bottom substrate 132. In the discussion of FIGURES such as FIG. 3, the terms above and below, up and down, upwardly and downwardly, and variants of these terms will be used to refer to the relative position of elements in the orientation of the FIGURES. The terms above and below do not dictate that certain elements need to be above or below each other in the final use application. However, these terms may be convenient throughout the application to refer to the relative position of elements in the FIGURES.

A layer of adhesive 134 is positioned between the prism substrate 130 and the reflective polarizer 124. A second layer of adhesive 136 is positioned between the reflective polarizer 124 and the bottom substrate 132.

When a prism structure is incorporated into a light management unit 100, certain optical artifacts may be visible when the light management unit is viewed directly and is illuminated with a diffuse approximately Lambertian light source. A Lambertian source is an optical source that obeys Lambert's cosine law, that is, that has an intensity directly proportional to the cosine of the angle from which it is viewed. This results in a radiation pattern that resembles a hemisphere. The backlight 112 combined with the diffuser plate 122 results in a diffuse light source in the display device 100 illustrated in FIG. 1. Where such a diffuse light source is used behind the light management unit, light is entering the light management unit from many different directions. Therefore, the backlight 112 may approximate a Lambertian light source.

Color Banding Optical Artifact

One example of an optical artifact that may be visible in the output from a light management unit that includes a directionally recycling film and a reflecting polarizer is the appearance of light and dark bands when the unit is viewed from oblique angles from the vertical, when the viewer is positioned parallel to the direction of the prism structure. The light bands are colored because the light is refracted by the prism structure. In some configurations and viewing conditions, the color is less apparent than in others. This color banding results from light rays that enter the film from above or below, are refracted by the prism structure and then exit the film at specific angles.

As discussed above, a diffuse light source behind the light management unit will cause light to enter the light management unit from many different directions. The angles and positions at which these light rays exit from the light management unit will be determined by factors unique to the prism geometry, such as the spacing of the prisms, the optical index of the prism coating, and the substrate thickness. Some light rays will impact the surfaces of the light management unit at angles where total internal reflection occur. The total internal reflection of these light rays will cause the occurrence of dark and neighboring bright bands when the light management unit is viewed from oblique angles. The bright bands are often observed to have a range of colors.

Figure 4:
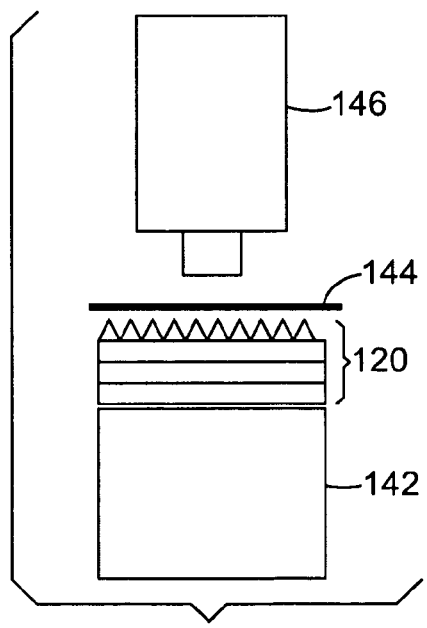
FIG. 4 shows a side schematic view of an experimental conoscope set up for measuring the intensity of light emerging from a light management unit.

To illustrate the output from a light management unit lit by a diffuse source, it is helpful to review a conoscopic plot of light emerging from a light management unit. The light and dark bands are noticeable in such a conoscopic plot. FIG. 4 illustrates one embodiment of an experimental apparatus for analyzing the light output from a light management unit 120. In the experimental configuration of FIG. 4, the light management unit 120 is positioned adjacent to a diffuse light source 142. A conoscope 146 is positioned on the opposite side of the light management unit 120. In addition, an absorbing glass polarizer 144 may be positioned between the conoscope and the light management unit 120. Conoscopic data was collecting using an EZContrast conoscope, available from Eldim SA, Herouville, Saint Clair, France.

Figure 5:
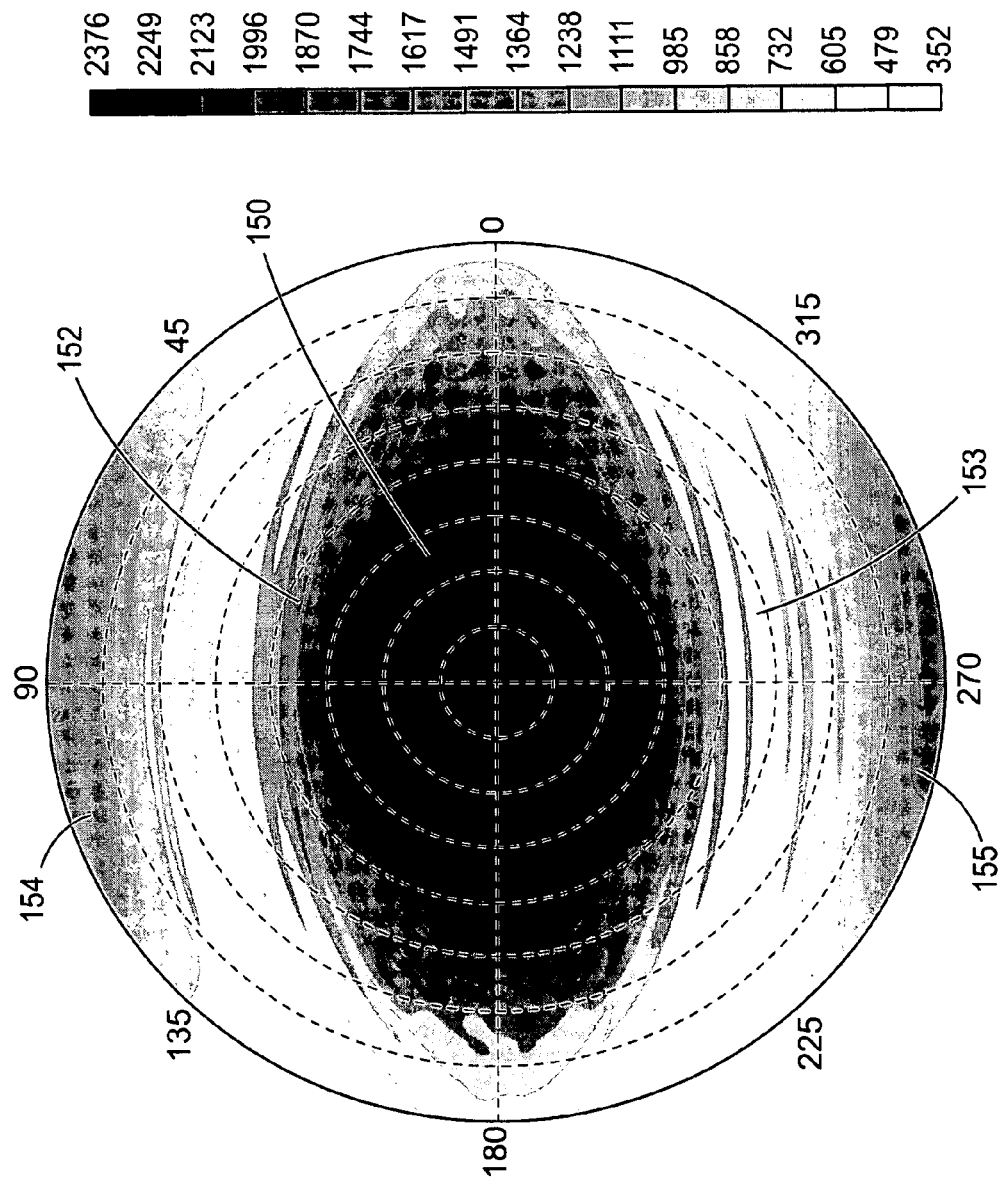
FIG. 5 is a conoscopic plot of light emerging from a light management unit that does not include a diffusing element.

A conoscopic plot of prism film illuminated from the planar side of the prism is shown in FIG. 5. A conoscopic measurement collects light rays from all incident angles from a source through a lens that projects the rays onto a detector. The detector/lens combination is designed such that light rays hitting the detector come from all directions and a single point. The plots allow interpretation of the angular distribution of light from the source.

In FIG. 5, the intensity of light at certain angles is indicated by the use of one of 16 different shades of gray ranging from white to black. The darkest areas indicate the highest intensity of light. The lightest areas indicate the areas where no light is received. The units shown on the numerical scale on the right side of FIG. 5 are candelas per square meter, providing an indication of the brightness of the display at particular viewing locations. As can be seen in FIG. 5, at oblique angles ranging from about 40° to 60° when the film is viewed from the perspective that is parallel to the prismatic ridges, dark and light neighboring bands are present.

The brightest area of the conoscopic plot of FIG. 5 is a North American football-shaped area 150 centered on the plot. At the edges of the football-shaped area 150, the light grows less intense moving away from the boundary of the football shaped area 150. However, upon reaching an angle from the vertical axis of about 40° or −40°, alternating bands of light and dark appear as the viewer moves in the direction perpendicular to the prismatic structures. These light and dark bands are seen in the area indicated at reference number 152 and 153 in FIG. 5.

In light management films with a prism structure other than straight prisms, the rainbow bands are present to a lesser degree when the viewer is parallel to the structures compared to a structure with straight prisms.

The origin of these colored bands will be discussed further later herein with respect to FIGS. 6 and 7.

Of note, the colored bands are typically not visible after the light management unit is incorporated into a typical LCD monitor or LCD-TV construction. Many LCD monitor or LCD-TV constructions include an anti-glare polarizer as a part of the LC display. This anti-glare polarizer is typically effective in mitigating the visibility of these polarized light bands. This result is due to the fact that the angular spacing of the light and dark bands is small, only roughly about 2 to 5 degrees. As a result, a single layer of film with a haze of 4 to 6 percent is sufficient to scatter the light in these bands and mitigate their visibility in the LCD system. Therefore, when the light management system is incorporated into an LCD system that includes an anti-glare polarizer between the viewer and the light management unit, then the light and dark bands will likely not be visible. However, some systems do not include an anti-glare polarizer in the LC display, so that the colored bands are visible in the LCD system. In addition, these colored bands will still be visible in the light management unit before it is incorporated into an LCD system. Therefore, personnel who are inspecting the light management unit for quality and uniformity will notice the colored bands. Therefore, it would be desirable to eliminate the appearance of these colored bands in the light management unit.

According to the present invention, the colored band structures may be hidden through the addition of diffusion elements or a diffusion structure in the structure of the light management unit 120. In one embodiment, the diffusion structure could be beads of different refracted index than the prism resin, micro-voids of air or other light scattering particles. Alternately, the surface of the prisms could be roughened to create a similar effect, yet another option is diffusing elements added to the bulk of the prism substrate, into the prism resin, or into the laminating adhesive. These diffusion structures would be added to at least the extent that they would eliminate the light and dark bands discussed above.

In one example, introduction of a diffusion structure within the light management unit 120 to eliminate the colored bands introduces a haze factor in the light management unit of 5% or more. In another example, the haze factor is 8%, while in another example it is 10% or more. In other exemplary configurations, the haze factor is 15% or less, 12% or less. In one embodiment, the haze factor is about 5%. In one embodiment, the haze factor is 10% or less, 9% or less, or 8% or less.

Other Control Advantages

In LCD-TVs, lighting systems that include an optical light management system where a prism structure is adjacent to the LC panel typically produce a brightness profile with a higher rate of change of brightness at moderately wide viewing angles, such as about 30 to 50 degrees, than systems where the prisms are under other films, such as being under a reflective polarizer or other diffuse film. This phenomenon is discussed and illustrated in U.S. Pat. No. 6,091,547, for example, which is incorporated herein by reference. In many applications a steep drop off of light as the viewer moves off-axis causes the displayed information to suddenly disappear even though there is some light is directed to the viewer at that angle. This effect is disconcerting to the viewer. The addition of a diffusing structure within the light management unit according to the present invention would also correct for this problem and reduce the rate of change of brightness.

Origin of Color Banding Optical Artifacts

In examining the origin of the colored bands, the inventors of the present invention discovered that light emanating from a light management unit that is illuminated by an approximately Lambertian source are banded or restricted into particular sets of output angles. This banding may be characterized by the number of surface interactions a particular light ray encounters while transmitting through the prism structure of film.

Figure 6:
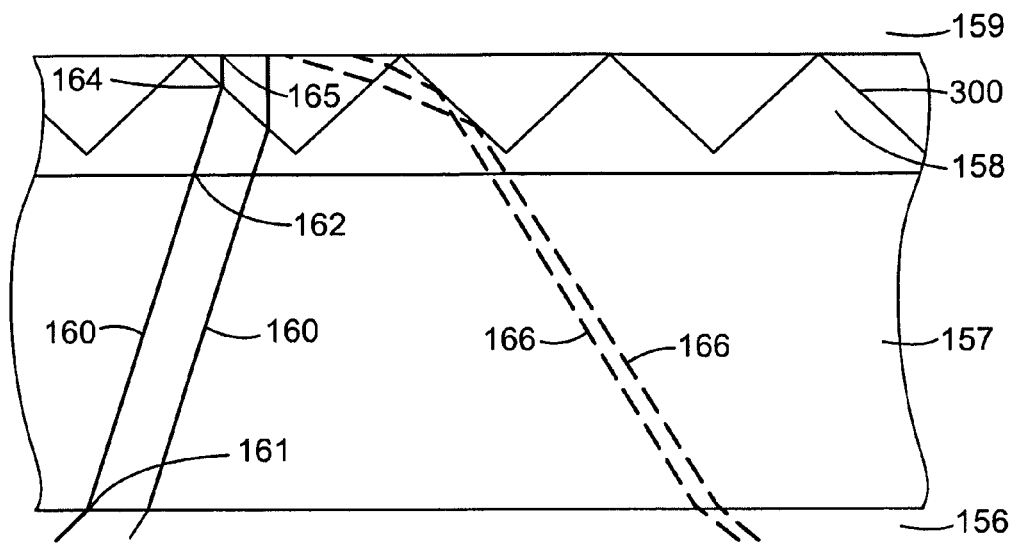
FIGS. 6-7 illustrate various ray paths having different numbers of surface interactions for light that emerges from the light source.
Figure 7:
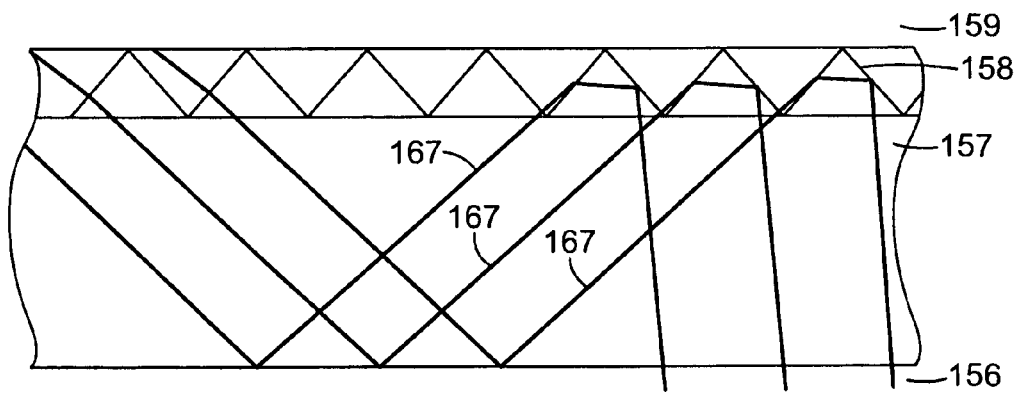

FIGS. 6 and 7 illustrate certain ray paths through a prism structure with specific numbers of surface interactions. For example, an ideal ray 160 in FIG. 6 starting out at roughly 30° from vertical and close to being in the plane normal to the major axis of the prisms 300 will enter a substrate 157 from the air 156, encounter a prism 158, and then strike a detector 159. This ray 160 will interact with four surfaces of the prism structure before it exits the light management unit on its way to the detector:

the substrate-air interface 161, the prism-substrate interface 162, the prism-air interface 164, and the air-detector interface 165.

The angular output of these ideal light rays that exit with only one pass through the prism structure film are generally concentrated in the football shaped area 150 of the plot of FIG. 5.

Another type of ray path exits the light management unit with only one pass through it, but exits at undesirable angles. As shown in FIG. 6, these rays 166 start out at roughly 30° from the vertical and close to being in the plane normal to the major axis of the prism, like the first group of rays that were discussed. However, these rays strike a prism-air facet at an undesirable, glancing angle, and therefore emerge from the light management unit at glancing angles. This group of ray paths exit with only one pass through the film but have five surface interactions and exit the film at reference number 166. The ray paths 166 emerge from the light management unit at glancing angles so that they would be represented in the conoscope in fairly well defined bands at the edge areas 154, 155 in FIG. 5.

FIG. 7 illustrates rays 167 with ten surface interactions. These rays emerge from the light management unit in discrete bands of light areas separated by dark areas at the edge areas 154, 155 of the conoscopic plot in FIG. 5. As the inventors identified the ray paths associated with many different numbers of surface interactions, they observed that for a given number of interactions, the light output was confined to severely restricted ranges of output angles. The number and types of surfaces that a particular ray encounters is determined by the detailed geometry of the film system, including substrate thickness. Therefore, the precise angular shape or banding of the output light is extremely dependent on the detailed geometry of the film system. For example, for the conoscopic plot shown in FIG. 5, the substrate thickness was 10 mils, the angle of the prismatic structures was 90°, the thickness of the prismatic structures was 25 microns, and the prisms had sharp peaks. The football-shaped area 150 of high intensity light output is desirable because it results in the highest light intensity at the angles at which a viewer is most likely to be positioned. However, the light and dark banding seen in areas 152, 153 of the conoscopic plot are not desirable. They cause the appearance of colored bands to a viewer viewing the light management unit from oblique angles along a sight line that is perpendicular to the prism structures.

A description of different techniques and structures for incorporating diffusion into the light management unit in order to eliminate or reduce the light and dark banding will now be discussed with reference to FIGS. 8-14.

Examples of Diffusing Structures in a Light Management Unit

Figure 8:
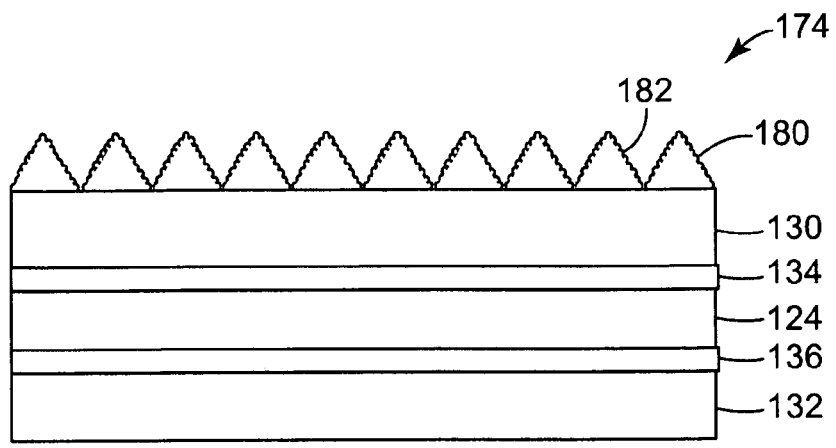
FIGS. 8-14 are cross-sectional schematic view of various light management units according to the present invention where some type of diffusing structure is included within the light management structure.

FIG. 8 illustrates one embodiment of a light management film 174 of the present invention where a prism structure 180 includes a roughened surface 182. The prism structure surface 182 is typically formed by molding a resin or polymer against a tool, and that tool may be roughened to provide the desired level of diffusion. Other elements in FIG. 8 (and in FIGS. 9-14) are numbered identically to the elements of FIG. 3, where like reference numbers indicate like structures.

Alternatively, the roughened surface 182 of the prism structure 180 in FIG. 8 could be created by a secondary coating process.

Figure 9:
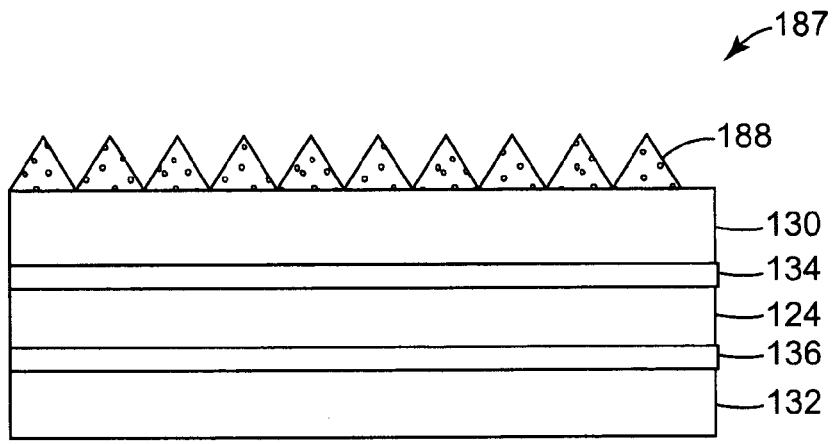

FIG. 9 illustrates another embodiment of a light management film 187 of the present invention where prism structures 188 incorporate integral light diffusing features. The diffusing features may be beads of different refractive index than the prism resin, micro-voids of air, or other light scattering particles.

Examples of diffusely reflective particles include titanium dioxide, barium sulphate, calcium carbonate or the like.

Figure 10:
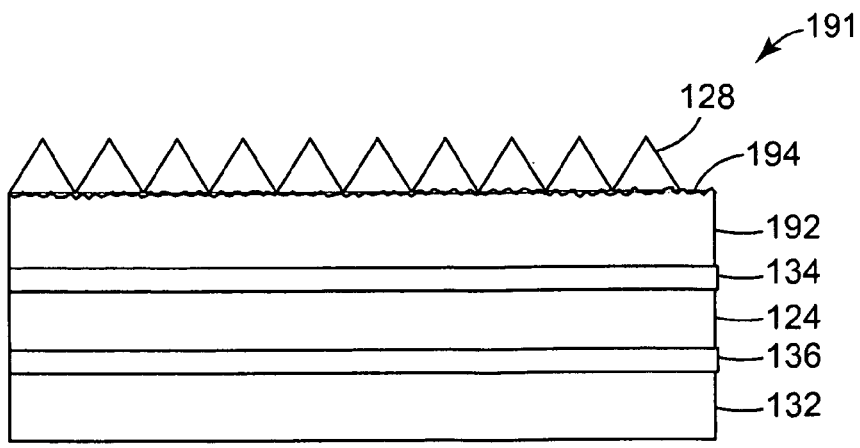

FIG. 10 illustrates another embodiment of a light management film 191 of the invention where light scattering is accomplished by an uneven surface and an index mismatch at the interface between the prism coating 128 and the prism substrate 192. The prism substrate 192 includes the uneven top surface 194.

Figure 11:
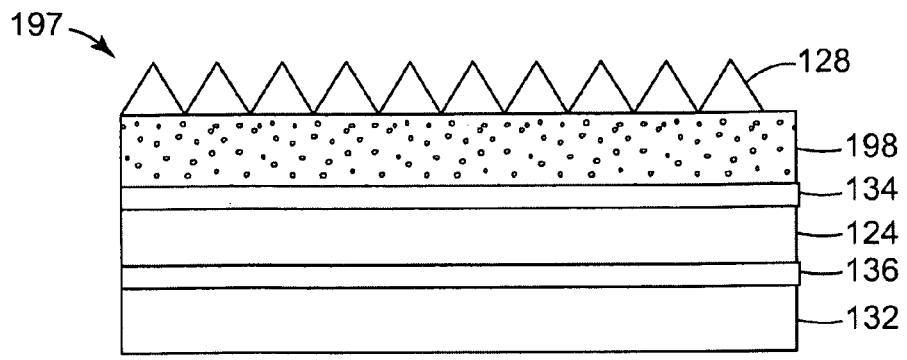

FIG. 11 illustrates another embodiment of a light management film 197 of the present invention where the prism substrate 198 incorporates light scattering particles. The light scattering particles may be any of the options discussed above with respect to FIG. 9.

Figure 12:
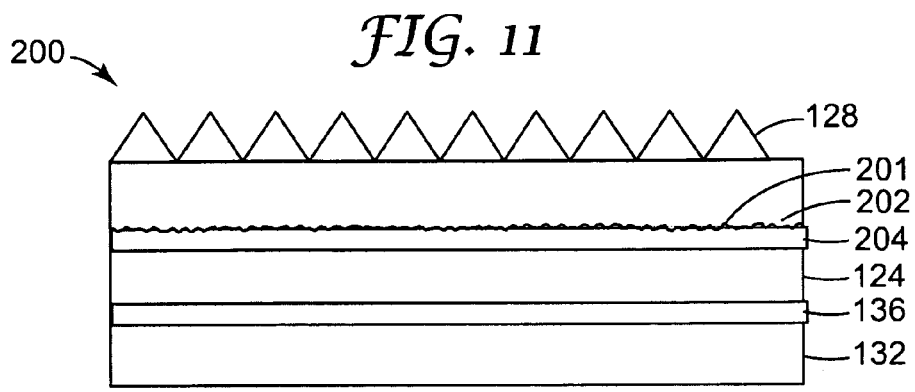

FIG. 12 illustrates yet another embodiment of a light management film 200 of the present invention where the prism substrate 202 includes a structured bottom surface 201. The structured bottom surface may be created using a tool or using a coating. In addition, adhesive layer 204 has a refractive index that is not similar or identical to the refracted index of the substrate. The mismatch in adhesive in refracted index and substrate refractive index, combined with the structured bottom substrate surface, will provide a level of diffusion to the light management unit 200 as a whole.

Figure 13:
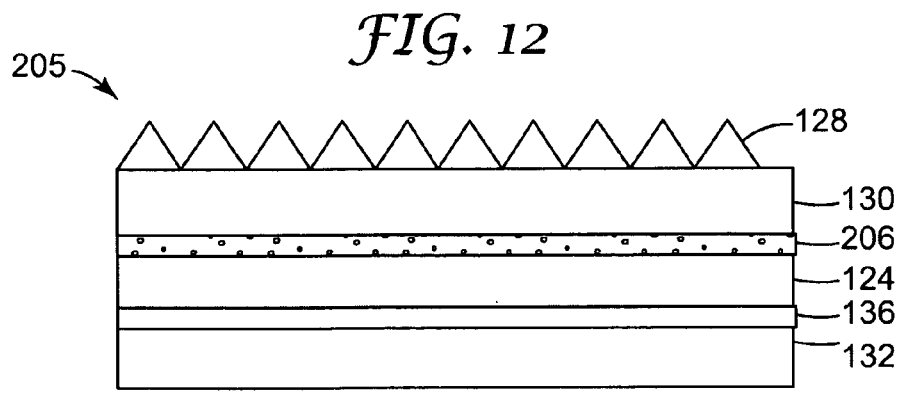

FIG. 13 shows an alternate embodiment of a light management film 205 of the present invention where an adhesive layer 206 between the prism substrate 130 and the reflective polarizer 124 incorporates light scattering particles.

Figure 14:
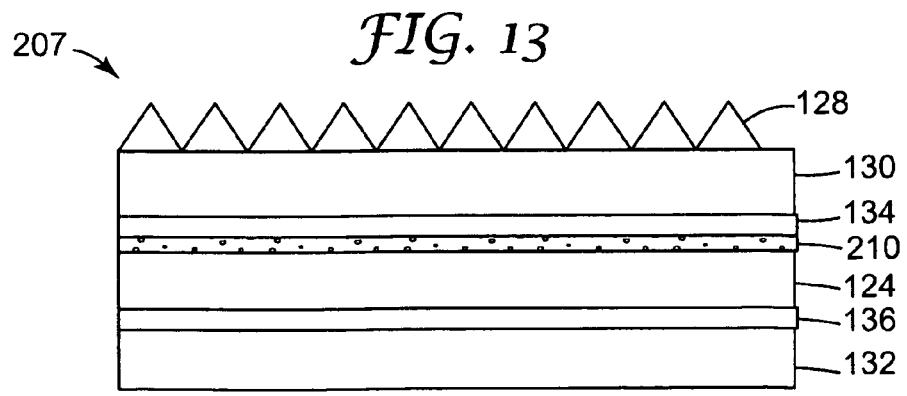

FIG. 14 illustrates a new light management unit 207 according to the present invention. The light management unit 207 includes a reflective polarizer skin layer 210 with diffuse features, positioned between the reflective polarizer 124 and the adhesive layer 134. A skin layer can include two or more immiscible polymers whose index of refraction differential provide light scattering effects and whose size distribution provide control of the amount of diffusion in the skin layer. Alternative methods of manufacture for diffusion include modified surface structures, and discrete particles added to the skin material. The skin layer may be produced in a separate process and attached permanently or semi-permanently to the optical medium via a lamination process including but not limited to pressure sensitive adhesives, thermosetting adhesives, and chemically or photo-cured adhesives.

Exemplary LCD Components

Some exemplary structures for the components of an LCD system according to the present invention will now be described.

The reflector 118 of the backlight 112 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as PET, PC, PP, PS (abbreviations not previously defined are defined below) loaded with diffusely reflective particles, such as titanium dioxide, barium sulphate, calcium carbonate or the like. Other examples of diffuse reflectors, including micro porous materials and fibril-containing materials, are discussed in co-owned U.S. Patent Application Publication 2003/0118805 A1, incorporated herein by reference. The selection of materials and structures for components of the light management unit will now be discussed.

Any suitable type of reflective polarizer may be used, for example, multi-layer optical film (MOF) reflective polarizers, such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of a MOF reflective polarizers include Vikuiti™ DBEF-D200 and DBEF-D440 multi-layer reflective polarizers that include diffusive surfaces, available from 3M Company, St. Paul, Minn.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

The illustrated embodiments of the present invention include a prism substrate 130 and a bottom substrate 132, although these substrates have been referred to using different reference numbers when diffusing structures were incorporated therein as shown in FIGS. 8-14. The substrates 130, 132 may be made of any material that is substantially transparent to visible light, for example, organic or inorganic materials, including glasses and polymers. The substrates 130, 132 of the different subassemblies need not be made of the same material. Suitable glasses include float glasses, i.e. glasses made using a float process, or LCD quality glasses, referred to as LCD glass, whose characteristic properties, such as thickness and purity, are better controlled than float glass. Suitable polymer materials may be amorphous or semi-crystalline, and may include homopolymer, copolymer or blends thereof. Polymer foams may also be used. Example polymer materials include, but are not limited to, amorphous polymers such as poly(carbonate) (PC); poly(styrene) (PS); acrylates, for example acrylic sheets as supplied under the ACRYLITE® brand by Cyro Industries, Rockaway, N.J.; acrylic copolymers such as isooctyl acrylate/acrylic acid; poly(methylmethacrylate) (PMMA); PMMA copolymers; cycloolefins and cycloolefin copolymers; acrylonitrile butadiene styrene (ABS); styrene acrylonitrile copolymers (SAN); epoxies; poly(vinylcyclohexane); PMMA/poly(vinylfluoride) blends; atactic poly(propylene); poly(phenylene oxide) alloys; styrenic block copolymers; polyimide; polysulfone; poly(vinyl chloride); poly(dimethyl siloxane) (PDMS); polyurethanes; poly(carbonate)/aliphatic PET blends; and semicrystalline polymers such as poly(ethylene); poly(propylene); poly(ethylene terephalate) (PET); poly(ethylene naphthalate)(PEN); polyamide; ionomers; vinyl acetate/polyethylene copolymers; cellulose acetate; cellulose acetate butyrate; fluoropolymers; poly(styrene)-poly(ethylene) copolymers; and PET and PEN copolymers.

The diffuser plate can serve the purpose of providing a support structure on which the films of the light management unit rest, in addition to providing more uniform illumination to the LCD. While each of the layers in the film stack of attached layers contributes to the stiffness of the stack, the substrate is the layer that contributes most to the stiffness, i.e. provides more resistance to bending than any of the other layers of the stack. The diffuser plate typically does not significantly deform under its own weight, although it may sag to a certain extent. The diffuser plate may be, for example, up to a few mm thick, depending on the size of the display and the type of material used. In one exemplary embodiment, a 30" LCD-TV has a 2 mil thick PMMA bulk diffuser plate. In another exemplary embodiment, a 40" LCD-TV has a 3 mil thick PMMA bulk diffuser plate. The diffuser plate can be a translucent polymer plate or glass plate, varying in thickness from 1-5 mm, inclusive.

The LC display 100 illustrated in FIG. 1 includes a diffuser plate 122. The diffuser plate 122 may be included in exemplary embodiments of the LC display of the present invention. Exemplary embodiments of the diffuser plate include a polymer matrix containing diffusing particles. The polymer matrix may be any suitable type of polymer that is substantially transparent to visible light, for example any of the polymer materials listed above.

The diffusing particles may be any type of particle useful for diffusing light, for example transparent particles whose refractive index is different from the surrounding polymer matrix, diffusely reflective particles, or voids or bubbles in the matrix. Examples of suitable transparent particles include solid or hollow inorganic particles, for example glass beads or glass shells, solid or hollow polymeric particles, for example solid polymeric spheres or hollow polymeric spheres. Examples of suitable diffusely reflecting particles include particles of titanium dioxide ($TiO_2$), calcium carbonate ($CaCO_3$), barium sulphate ($BaSO_4$), magnesium sulphate ($MgSO_4$) and the like. In addition, voids in the polymer matrix may be used for diffusing the light. Such voids may be filled with a gas, for example air or carbon dioxide. Commercially available materials suitable for use in a diffuser plate include 3M™ Scotchcal™ Diffuser Film, type 3635-70 and 3635-30, and 3M™ Scotchcal™ ElectroCut™ Graphic Film, type 7725-314, available from 3M Company, St. Paul, Minn. Other commercially available diffusers include acrylic foam tapes, such as 3M™ VHB™ Acrylic Foam Tape No. 4920.

The diffuser plate 122 may optionally be supplemented with an additional patterned diffuser. The patterned diffuser 122 may include, for example, a patterned diffusing surface or a printed layer of diffuser, such as particles of titanium dioxide ($TiO_2$). The patterned layer may lie between the diffuser plate 122 and the substrate 132, or above the diffuser plate 122. The patterned diffuser may be, for example, printed onto the diffuser plate 122 or onto a sheet that lies above the diffuser plate 122.

The above specification provides a complete description of the structure and use of the invention. Since many of the embodiments of the invention can be made without parting from the spirit and scope of the invention, the invention resides in the claims.

We claim:

1. A light management unit for attachment to a display module, including:
   a) a directionally recycling layer including a structured side and a planar side where the structured side includes prism structures;
   b) a reflective polarizer adapted to transmit light having a first polarization orientation and to reflect light having a different polarization orientation, wherein the reflective polarizer is positioned on the planar side of the directionally recycling layer;
   c) a diffusion structure incorporated into the directionally recycling layer or the interfaces between the directional recycling layer and the reflective polarizer, where the diffusion structure diffuses light that passes through the diffusion structure,
      (i) wherein the diffusion caused by the diffusion structure is sufficient to prevent the appearance of colored bands when a viewer positioned along a line of sight perpendicular to the prism structures views the light management unit at an oblique angle from a vertical axis.

2. The unit of claim 1, wherein the prism structures have an angle of 90 degrees.

3. The unit of claim 1, wherein the diffusion structure includes a roughened surface on the structured side of the directionally recycling layer.

4. The unit of claim 1, wherein the directionally recycling layer comprises:
   a prism substrate layer that includes the planar side; and
   a prism structure layer that includes the structured side;
   wherein the diffusion structure includes light diffusing features scattered throughout an interior of the prism structure layer.

5. The unit of claim 4, wherein the light diffusing features are selected from the group of beads of a different refractive index than a resin forming the prism structures, micro-voids of air, and light scattering particles.

6. The unit of claim 1, wherein the directionally recycling layer includes:
   a prism substrate layer that includes the planar side; and
   a prism structure layer that includes the structure side;
   wherein the diffusion structure includes light diffusing features scattered throughout an interior of the prism substrate layer.

7. The unit of claim 6, wherein the light diffusing features are selected from the group of beads of a different refractive index than a resin forming the prism substrate, micro-voids of air, and light scattering particles.

8. The unit of claim 1, wherein the directionally recycling layer includes:
   a prism substrate layer that includes the planar side; and
   a prism structure layer that includes the structure side;
   wherein the diffusion structure includes:
   a difference in indices of refraction between the prism substrate layer and the prism structure layer; and
   a roughened surface on the prism substrate layer that is adjacent to the prism structure layer.

9. The unit of claim 1, wherein the directionally recycling layer includes:
   a prism substrate layer that includes the planar side; and
   a prism structure layer that includes the structure side;
   wherein the light management unit further comprises an adhesive layer between the prism substrate layer and the reflective polarizer,
   wherein the diffusion structure includes:
   a difference in indices of refraction between the prism substrate layer and the adhesive layer; and
   a roughened surface on the side of the prism substrate layer that is adjacent to the adhesive layer.

10. The unit of claim 1, further comprising:
    (a) an adhesive layer between the directionally recycling layer and the reflective polarizer, wherein the diffusion structure includes light scattering particles in the adhesive layer.

11. The unit of claim 1, wherein the diffusion structure comprises:
    (a) a reflective polarizer skin layer with diffuse features, positioned between the directionally recycling layer and the reflective polarizer.

12. A display system, comprising:
    a) a backlight;
    b) a liquid crystal display (LCD) panel comprising upper and lower plates and a liquid crystal layer disposed between the upper and lower plates; and
    c) a light management unit disposed between the backlight and the LCD panel, wherein the light management unit includes:
       (i) a directionally recycling layer including a structured side and a planar side where the structured side includes prism structures;
       (ii) a reflective polarizer adapted to transmit light having a first polarization orientation and to reflect light having a different polarization orientation, wherein the reflective polarizer is positioned on the planar side of the directionally recycling layer;
       (iii) a diffusion structure incorporated into the directionally recycling layer or the interfaces between the directional recycling layer and the reflective polarizer, wherein the diffusion caused by the diffusion structure is sufficient to prevent the appearance of colored bands when a viewer positioned to be parallel to the direction of the prism structures views light management unit at an oblique angle from a vertical axis.

13. The system of claim 12, wherein the prism structures have an angle of about 90 degrees.

14. The system of claim 12, wherein the diffusion structure includes a roughened surface on the structured side of the directionally recycling layer.

15. The system of claim 12, wherein the directionally recycling layer includes:
    a prism substrate layer that includes the planar side; and
    a prism structure layer that includes the structured side;
    wherein the diffusion structure includes light diffusing features scattered throughout an interior of the prism structure layer.

16. The system of claim 15, wherein the light diffusing features are selected from the group of beads of a different refractive index than a resin forming the prism structures, micro-voids of air, and light scattering particles.

17. The system of claim 12, wherein the directionally recycling layer includes:
    a prism substrate layer that includes the planar side; and
    a prism structure layer that includes the structure side;

wherein the diffusion structure includes light diffusing features scattered throughout an interior of the prism substrate layer.

18. The system of claim 17, wherein the light diffusing features are selected from the group of beads of a different refractive index than a resin forming the prism substrate, micro-voids of air, and light scattering particles.

19. The system of claim 12, wherein the directionally recycling layer includes:
a prism substrate layer that includes the planar side; and
a prism structure layer that includes the structure side;
wherein the diffusion structure includes:
a difference in indices of refraction between the prism substrate layer and the prism structure layer; and
a roughened surface on the prism substrate layer that is adjacent to the prism structure layer.

20. The system of claim 12, wherein the directionally recycling layer includes:
a prism substrate layer that includes the planar side; and
a prism structure layer that includes the structure side;
wherein the light management unit further comprises an adhesive layer between the prism substrate layer and the reflective polarizer,
wherein the diffusion structure includes:
a difference in indices of refraction between the prism substrate layer and the adhesive layer; and
a roughened surface on the side of the prism substrate layer that is opposite from the prism structure layer.

21. The system of claim 12, further comprising:
(a) an adhesive layer between the directionally recycling layer and the reflective polarizer, wherein the diffusion structure includes light scattering particles in the adhesive layer.

22. The system of claim 12, wherein the diffusion structure comprises:
(a) a reflective polarizer skin layer with diffuse features, positioned between the reflective polarizer and the prism layer.

* * * * *